(12) United States Patent  
Terada et al.

(10) Patent No.: US 7,671,553 B2  
(45) Date of Patent: Mar. 2, 2010

(54) SERVO CONTROLLER

(75) Inventors: Kei Terada, Tokyo (JP); Tetsuaki Nagano, Tokyo (JP); Kazutaka Takahashi, Tokyo (JP); Takashi Isoda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 971 days.

(21) Appl. No.: 10/552,825

(22) PCT Filed: Apr. 11, 2003

(86) PCT No.: PCT/JP03/04642

§ 371 (c)(1), (2), (4) Date: Oct. 7, 2005

(87) PCT Pub. No.: WO2004/092859

PCT Pub. Date: Oct. 28, 2004

(65) Prior Publication Data

US 2006/0186845 A1    Aug. 24, 2006

(51) Int. Cl.  
*H02P 7/00* (2006.01)

(52) U.S. Cl. .................. 318/432; 318/609; 318/610

(58) Field of Classification Search .............. 318/432, 318/609, 610  
See application file for complete search history.

(56) References Cited

U.S. PATENT DOCUMENTS 5,710,498 A * 1/1998 Yutkowitz et al. ........... 318/632

FOREIGN PATENT DOCUMENTS

| JP | 53-65916 A | 6/1978 |
|----|------------|--------|
| JP | 62-226206 A | 10/1987 |
| JP | 3-218503 A | 9/1991 |
| JP | 6-30578 A | 2/1994 |
| JP | 9-244747 A | 9/1997 |
| JP | 11-341885 A | 12/1999 |
| JP | 2000-69781 A | 3/2000 |
| JP | 2001-22448 A | 1/2001 |
| JP | 2001-100819 A | 4/2001 |
| JP | 2001-273037 A | 10/2001 |

* cited by examiner

*Primary Examiner*—Walter Benson  
*Assistant Examiner*—Renata McCloud  
(74) *Attorney, Agent, or Firm*—Sughrue Mion, PLLC

(57) ABSTRACT

In a servo controller according to the invention, a position feedback correction unit (3) calculates a first-axis position feedback signal (pmfb1) based on a first-axis position (pm1) as a self-axis position, and a second-axis position (pm2) as an other-axis position; and a deviation between a model position (pa1) and the first-axis position feedback signal (pmfb1) is inputted from a subtracter (5) to a position control unit (4), which performs positional control to output a velocity command. A velocity feedback correction unit (6) calculates a first-axis velocity feedback signal (wmfb1) from a first-axis velocity (wm1) as the self-axis velocity, and a second-axis velocity (wm2) as the other-axis velocity; and the velocity control unit (8) adds a model velocity (wa1) and the velocity command outputted from the position control unit (5), and subtracts the first-axis velocity feedback signal (wmfb1) therefrom, and outputs a feedback torque command (Tfb1) based on the corrected velocity command.

15 Claims, 18 Drawing Sheets

SERVO CONTROLLER

TECHNICAL FIELD

The present invention relates to servo controllers for controlling the position of an electric motor as a load, and particularly to a servo controller that is applied to synchronous control of a multiaxial driving machine.

BACKGROUND ART

There has been a biaxial driving machine in which a moving table is supported by two ball screws disposed in parallel, and is driven by synchronously controlling two servomotors that are connected respectively to the two ball screws. The moving table in the biaxial driving machine installs, in general, an upper structure that is movable, and the center of gravity of the moving table varies according to the position of the upper structure, the load supported by the upper structure, and the like.

Moreover, a position control device for a motor has been disclosed in Patent Document 1 (Japanese Patent Laid-Open No. 30578/1994) as related to position control devices for motors (direct-current motors, induction motors, synchronous motors, etc.) that drive load devices such as a table in a machining apparatus and arms of an electric industrial robot.

Patent Document 1 aims to realize a position control device for motors, which has a high-speed response, prevents throb of machinery, and has a constant response frequency at all times even if the inertia moment of the load device varies. In the position control device for motors in Patent Document 1 (line 23 through line 36 in the right column in page 5), a first velocity signal is acquired by means of a first position control circuit, and a second velocity signal is acquired by means of a second position control circuit for controlling a mechanical simulation circuit. In addition, the first and second velocity signals are added to acquire a third velocity signal, and a first torque signal is acquired by means of a first velocity control circuit, to which the third velocity signal has been inputted. Likewise as above, second and third torque signals are acquired by means of second and third velocity control circuits, and the torque generated in the motor is controlled so as to follow the final torque signal calculated by adding the first through the third torque signals.

The position control device for motors in Patent Document 1 includes the second position control circuit, the second velocity control circuit, and the mechanical simulation circuit, whereby there is a benefit in that the response of the positional control with respect to the changing of a rotation angle command signal can be enhanced. In addition, by including the third velocity control circuit, there is a benefit in that the response of the positional control with respect to the changing of the load torque can be also enhanced.

Moreover, as related to control systems for synchronously positioning legs on both ends of a machining apparatus having a movable structure of a gate form or the like, a synchronous position control device has been disclosed in Patent Document 2 (Japanese Patent Laid-Open No. 226206/1987), which aims to achieve a synchronous position control system that does not generate asymmetry due to disturbance.

In Patent Document 2 (line 3 through line 10 in the lower left column in page 2), in a system in which on both sides of the movable structure, position control systems that move along both the sides according to position command values are provided, and in which the position control systems synchronously position both ends of the movable structure, a problem of asymmetry due to disturbance has been resolved by calculating the difference between movement positions of both the ends of the movable structure, calculating compensation values by applying compensation elements on the difference, and feeding back the compensation values to the respective position control systems.

When the position control device for motors in Patent Document 1 described above is applied to control of a biaxial driving machine, if load inertias of two axes are balanced, the first axis and the second axis identically move, whereby appropriate driving can be performed. However, when the inertias of the two axes are unbalanced, because movements of the first axis and the second axis do not coincide, a deviation (between-axes positional deviation) arises between the actual position of the first axis and the actual position of the second axis. There has been a problem in that the between-axes positional deviation degrades positioning accuracy of the moving table and generates stress on the machine, which shortens the machine life, and may cause damage on the machine at worst.

Therefore, there has been a problem in that the position control device for motors in Patent document 1 described above cannot be applied to the control of a biaxial driving machine in which large load unbalance is present.

Meanwhile, the synchronous position control system in Patent Document 2 described above feeds back the difference between the positions in the two position control systems (between-axes positional deviation) to the two position command values to resolve asymmetry. When the control system is applied to the control of a biaxial driving machine, a certain level of the between-axes positional deviation can be suppressed; however, in order to suppress a large between-axes positional deviation, a response of a position command correction unit (coefficient H1 here) must be set to an extremely large value. When the response of the position command correction unit is set to an extremely large value, although a high-rigidity machine has no problem, a low-rigidity machine has a problem in that the system sometimes gets unstable, because oscillation of the machine is caused, for example.

Moreover, setting the gain to a high value sometimes encourages a conflict between axes, which is generated when position detection errors or the like are present. There has been a problem in that, when a conflict between axes arises, the motor generates heat due to the pulling torque between axes, which prevents high-speed and highly accurate control, and the machine might be damaged due to the pull between axes at worst Therefore, there has been a problem in that the synchronous position control device in Patent Document 2 described above cannot be applied to a low-rigidity machine or a machine in which position detection errors are present.

The present invention has been made to resolve the problems described above, and aims to realize a servo controller that is applicable to a low-rigidity machine or a biaxial driving machine in which position detection errors are present.

DISCLOSURE OF THE INVENTION

A servo controller according to the present invention includes: a position feedback correction unit for correcting a position feedback signal based on a self-axis position and an other-axis position; a position control unit for performing, according to a corrected position feedback signal outputted from the position feedback correction unit, positional control to output a velocity command; a velocity feedback correction unit for correcting a velocity feedback signal based on the self-axis velocity and the other-axis velocity; and a velocity control unit for outputting a feedback torque command based on the velocity command outputted from the position control unit, and on a corrected velocity feedback signal outputted from the velocity feedback correction unit; whereby an enormous effect in suppressing the between-axes positional deviation can be achieved by simultaneously performing a feedback of between-axes positional deviation and a feedback of between-axes velocity deviation.

Moreover, in the position feedback correction unit, the between-axes positional deviation, filtered and gained, that is the difference between the self-axis position and the other-axis position, is used to correct the position feedback signal, whereby an effect in suppressing the between-axes positional deviation can be achieved without generating vibrations due to high-frequency components when only low-frequency components in the between-axes positional deviation are fed back.

Furthermore, in the position feedback correction unit, the gain applied to the between-axes positional deviation that is the difference between the self-axis position and the other-axis position is variable, whereby the system can be changed to the master/slave control by changing the gain, so that the servo controller can be used for various purposes without increasing software load.

Moreover, in the velocity feedback correction unit, the between-axes velocity deviation, filtered and gained, that is the difference between the self-axis velocity and the other-axis velocity, is used to correct the velocity feedback signal, whereby an effect in suppressing the between-axes positional deviation can be achieved without generating vibrations due to high-frequency components when only low-frequency components in the between-axes velocity deviation are fed back.

Furthermore, in the velocity feedback correction unit, the gain applied to the between-axes velocity deviation that is the difference between the self-axis velocity and the other-axis velocity is variable, whereby the system can be changed to the master/slave control by changing the gain, so that the servo controller can be used for various purposes without increasing software load.

Moreover, the servo controller according to the invention includes: a reference model control unit for calculating, based on a position command, a model position and a model acceleration; a position control unit for performing, according to the difference between the model position and the self-axis position, positional control to output a velocity command; a velocity control unit for outputting a feedback torque command based on the velocity command outputted from the position control unit, and on the self-axis velocity; a model torque calculation unit for correcting, according to the self-axis position and an other-axis position, the model acceleration to calculate a model torque; and an accumulator for calculating a torque command based on the model torque and the feedback torque command; whereby correction according to feedforward components can be performed by correcting the between-axes positional deviation by means of the model torque correction unit, and the system is not likely to get unstable even if the gain is increased, so that an enormous effect in suppressing the between-axes positional deviation can be achieved.

Furthermore, the reference model control unit is configured so as to calculate, based on the position command, a model position, a model velocity, and a model acceleration, and the velocity control unit outputs the feedback torque command based on the velocity command outputted from the position control unit, on the model velocity, and on the self-axis velocity, whereby the servo controller can be applied to use for high acceleration/deceleration commands.

Moreover, because, in the model torque correction unit, the correction unit's correction operation is started and stopped, or correction gains are changed in accordance with time and with a waveform of the velocity command, by setting the gains at high values while a large between-axes positional deviation arises, and by setting the gains at low values or suspending the correction during the rest of the term, effects of noise and disturbances can be suppressed, and accuracy in the model torque correction can be enhanced, so that performance in suppressing the between-axes positional deviation can be enhanced.

Furthermore, in the model torque correction unit, polarity is inverted using the sign of the inputted model acceleration having been filtered through a high-pass filter, whereby the correction can be appropriately performed even when the sign of the between-axes positional deviation changes depending on the condition, so that enhancement of performance in suppressing the between-axes positional deviation can be achieved.

Moreover, the servo controller according to the invention includes: a reference model control unit for calculating, based on a position command, a model position and a model acceleration; a position feedback correction unit for correcting a position feedback signal based on a self-axis position and an other-axis position; a position control unit for performing, according to the difference between the model position and a corrected position feedback signal outputted from the position feedback correction unit, positional control to output a velocity command; a velocity feedback correction unit for correcting a velocity feedback signal based on the self-axis velocity and the other-axis velocity; a velocity control unit for outputting a feedback torque command based on the velocity command outputted from the position control unit, and on a corrected velocity feedback signal outputted from the velocity feedback correction unit; a model torque calculation unit for correcting, according to the other-axis model acceleration, to the self-axis position, and to the other-axis position, the model acceleration, to calculate a model torque; and an accumulator for calculating a torque command based on the model torque and the feedback torque command; whereby complete correction according to feedforward components can be performed by correcting the between-axes positional deviation by means of the model torque correction unit, so that an effect in suppressing the between-axes positional deviation can be achieved without worrying about causing instability.

Furthermore, the reference model control unit is configured so as to calculate, based on the position command, a model position, a model velocity, and a model acceleration, and the velocity control unit outputs the feedback torque command based on the velocity command outputted from the position control unit, on the model velocity, and on the corrected velocity feedback signal outputted from the velocity feedback correction unit, whereby the servo controller can be applied to use for high acceleration/deceleration commands.

BEST MODE FOR CARRYING OUT THE INVENTION

Embodiment 1

Figure 1:
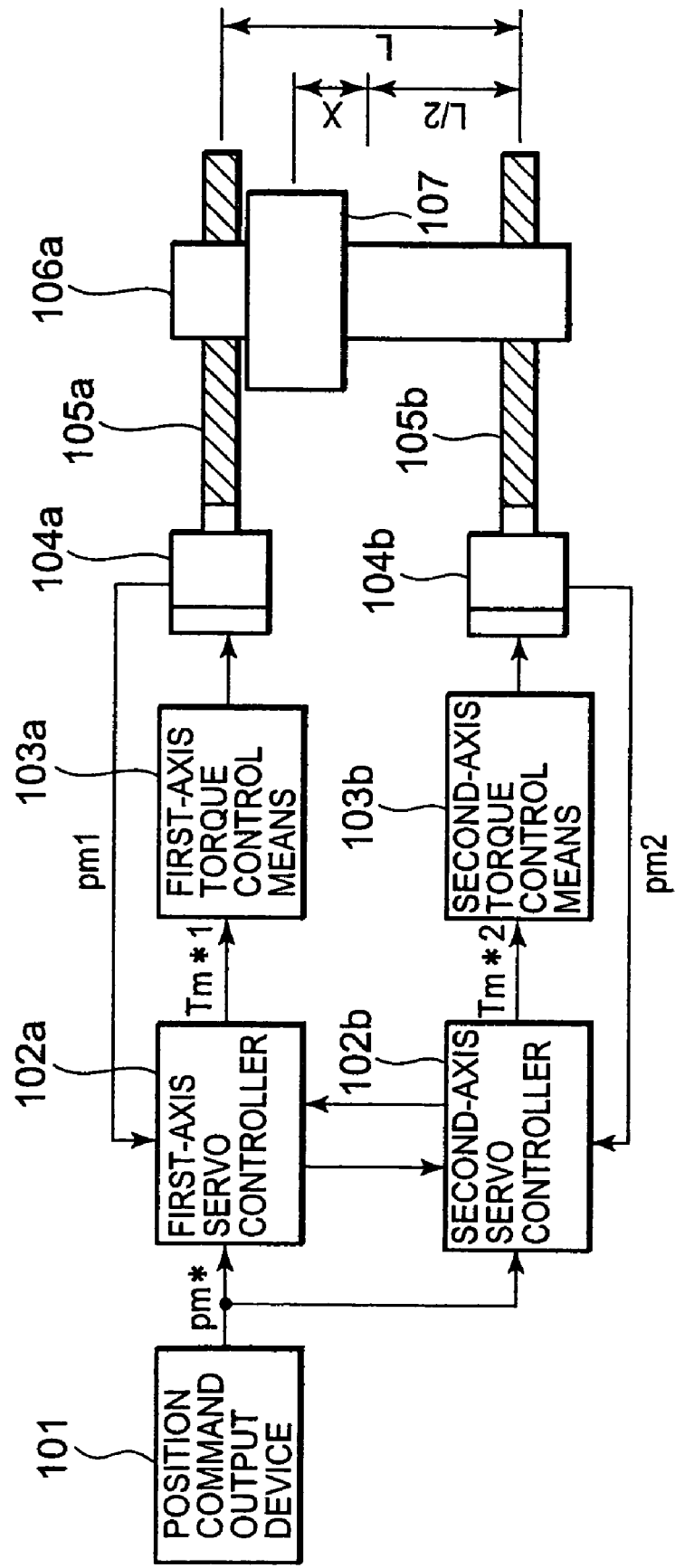
FIG. 1 is a diagram illustrating the configuration of a biaxial driving machine.

The configuration and operations of a biaxial driving machine will be described using FIG. 1.

A position command output device 101 outputs a position command pm* to a first-axis servo controller 102a and a second-axis servo controller 102b.

The first-axis servo controller 102a outputs a torque command Tm*1 to a first-axis torque control means 103a based on the position command pm* outputted by the position command output device 101 and an actual position pm1 of the first axis. The first-axis torque control means 103a controls a first-axis servomotor 104a in accordance with the torque command Tm*1.

The second-axis servo controller 102b outputs a torque command Tm*2 to a second-axis torque control means 103b based on the position command pm* outputted by the position command output device 101 and an actual position pm2 of the second axis. The second-axis torque control means 103b controls a second-axis servomotor 104b in accordance with the torque command Tm*2.

The first-axis servomotor 104a and the second-axis servomotor 104b are coupled to a first-axis ball screw 105a and a second-axis ball screw 105b, respectively. A moving table 106 is moved by driving both the axes. The moving table 106 in the biaxial driving machine carries an upper structure 107, and the center of gravity of the moving table 106 varies according to the position and the like of the upper structure 107.

Here, L is the distance between the axes (between the first-axis ball screw 105a and the second-axis ball screw 105b), and X is the distance from the center location between the axes to the center location of the upper structure 107.

Moreover, the configuration is so that actual position information and actual velocity information on each other's axis can be exchanged between the servo controllers for both the axes.

Furthermore, the control of the first-axis servo controller 102a and the control of the second-axis servo controller 102b are the same, and, hereinafter, the control of the servo controller will be described, taking the first-axis servo controller 102a as an example.

Figure 2:
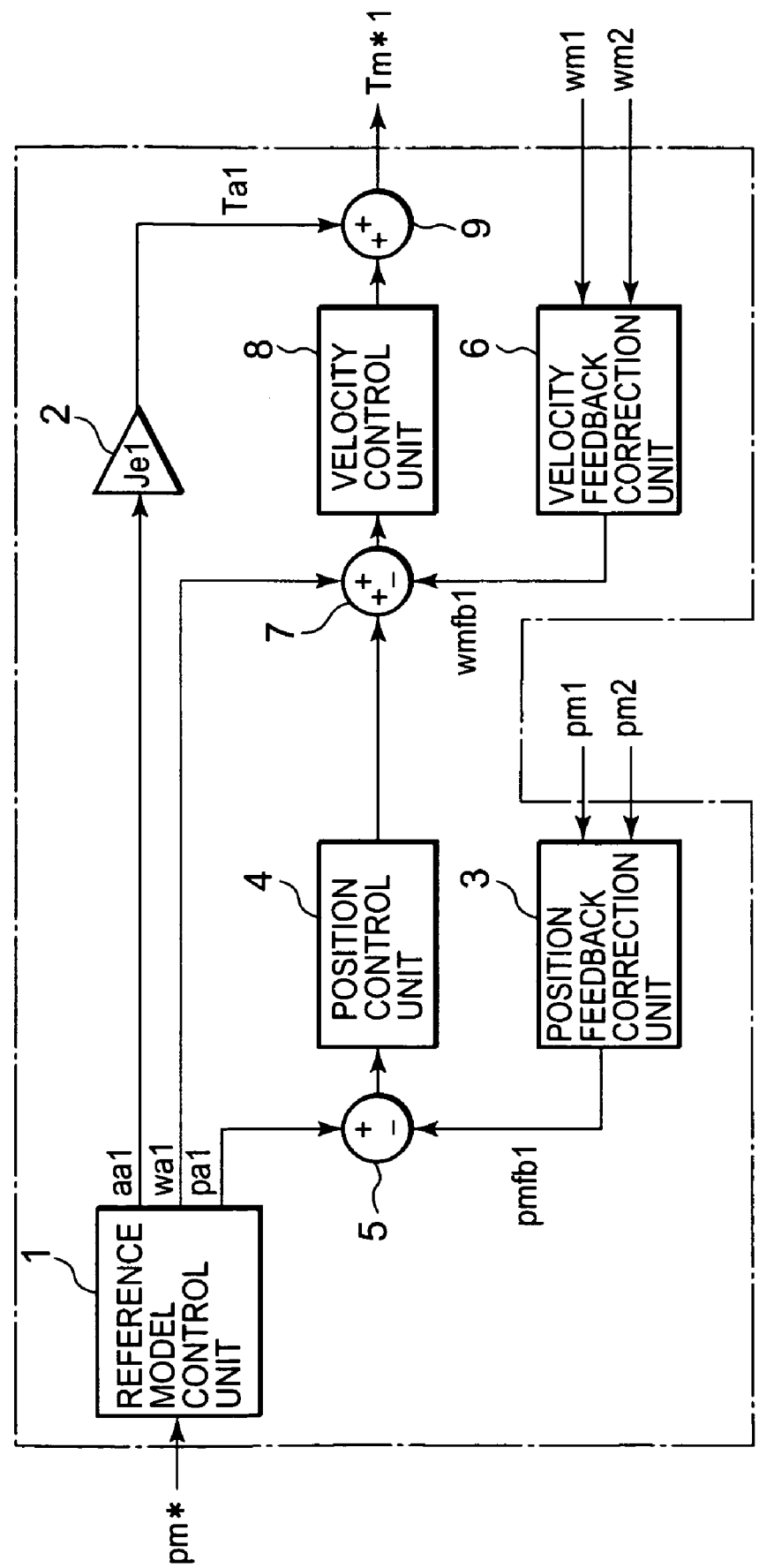
FIG. 2 is a diagram illustrating the configuration of a servo controller used. in the biaxial driving machine relevant to Embodiment 1 of the invention.

Next, the configuration and operations of the servo controller according to Embodiment 1 will be described according to FIG. 2, taking the first-axis servo controller 102a as an example.

The position command pm* outputted from the position command output device 101 (not illustrated) is inputted to a reference model control unit 1, which calculates and outputs a model position pa1, a model velocity wa1, and a model acceleration aa1.

A model torque calculation unit 2 multiplies the model acceleration aa1 by a first-axis inertia value Je1 to output a model torque Ta1.

A position feedback correction unit 3 outputs a first-axis position feedback signal pmfb1 from a first-axis position pm1 as the self-axis position, and a second-axis position pm2 as the other-axis position. The deviation between the model position pa1 and the first-axis position feedback signal pmfb1 is inputted from a subtracter 5 to a position control unit 4, which performs positional control, and outputs a velocity command.

A velocity feedback correction unit 6 outputs a first-axis velocity feedback signal wmfb1 from a first-axis velocity wm1 as the self-axis velocity, and a second-axis velocity wm2 as the other-axis velocity. A computing unit 7 adds the model velocity wa1 and the velocity command outputted from the position control unit 5, and subtracts the first-axis velocity feedback signal wmfb1 from the result, and outputs the corrected velocity command. A velocity control unit 8 outputs a feedback torque command Tfb1 based on the velocity command outputted from the computing unit 7.

An accumulator 9 adds the feedback torque command Tfb1 and the model torque Ta1 outputted from the model torque calculation unit 2, and outputs the result as a torque command Tm*1 for the first axis.

The servo controller according to Embodiment 1 is configured so that each other's actual position information and actual velocity information are exchanged. An example in which the second-axis position pm2 and the second-axis velocity wm2 are used in the first-axis servo controller 102a has been described using FIG. 2.

Figure 3:
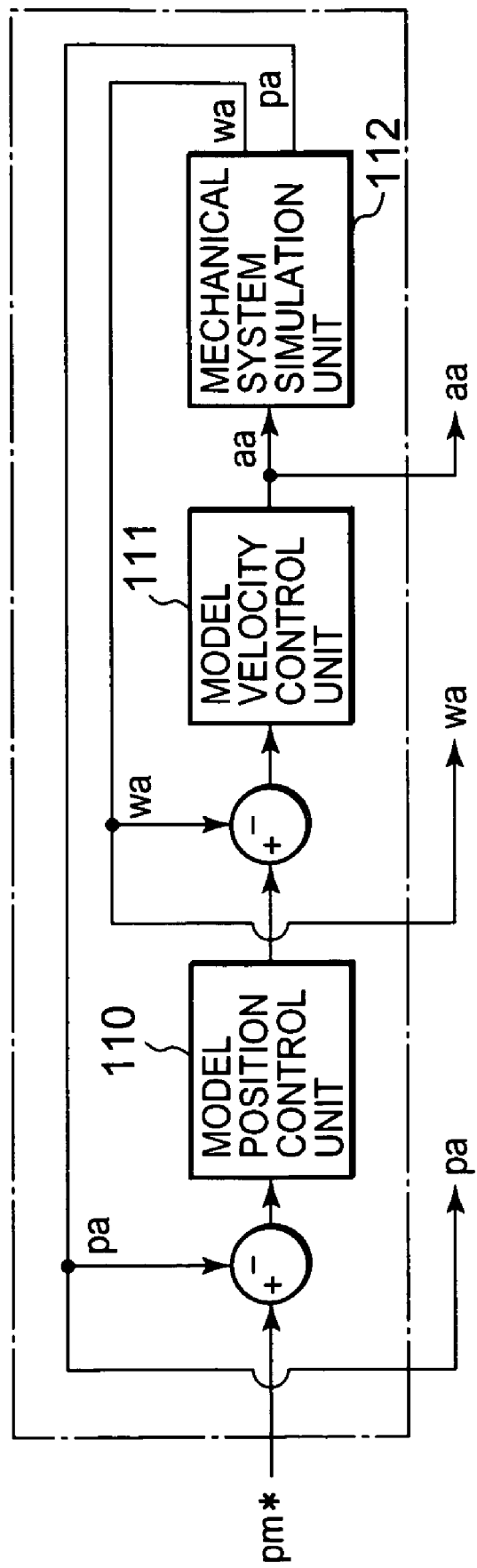
FIG. 3 is a diagram illustrating the configuration of a reference model control unit 1 in the servo controller.

Next, the configuration and operations of the reference model control unit 1 will be described according to FIG. 3. The reference model control unit 1 outputs based on a position command the model position pa, the model velocity wa, and the model acceleration aa for simulating an ideal movement of the machine.

The difference between the position command pm* outputted from the position command output device 101 (not illustrated) and the model position pa outputted from a mechanical system simulation unit 112 is inputted to a model position control unit 110, which generates a model velocity command, and outputs the model velocity command to a model velocity control unit 111. The difference between the model velocity command and the model velocity wa is inputted to the reference model control unit 111, which generates a model acceleration aa, and outputs the model acceleration to the mechanical system simulation unit 112. The model acceleration aa is inputted to the mechanical system simulation unit 112, which calculates the model velocity wa and the model position pa.

Figure 4:
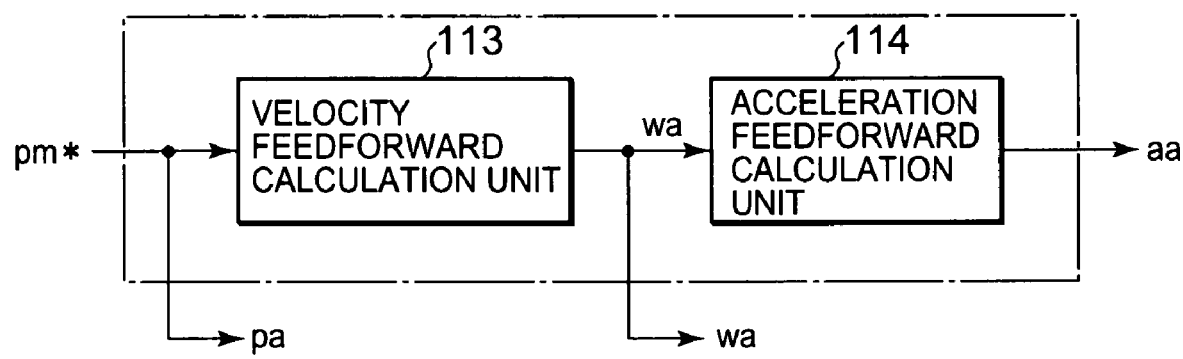
FIG. 4 is a diagram illustrating the configuration of another reference model control unit 1 in the servo controller.

In addition, an example of the configuration and operations of another reference model control unit 1 will be described according to FIG. 4.

The position command pm* outputted from the position command output device 101 (not illustrated) is used as a model position pa, and the position command pm* is inputted to a velocity feedforward calculation unit 113, which calculates and outputs a model velocity wa. The model velocity wa is inputted to an acceleration feedforward calculation unit 114, which calculates and outputs a model acceleration aa.

The velocity feedforward calculation unit 113 and the acceleration feedforward calculation unit 114 are, in general, configured with a differentiation device or a highpass filter.

Figure 5:
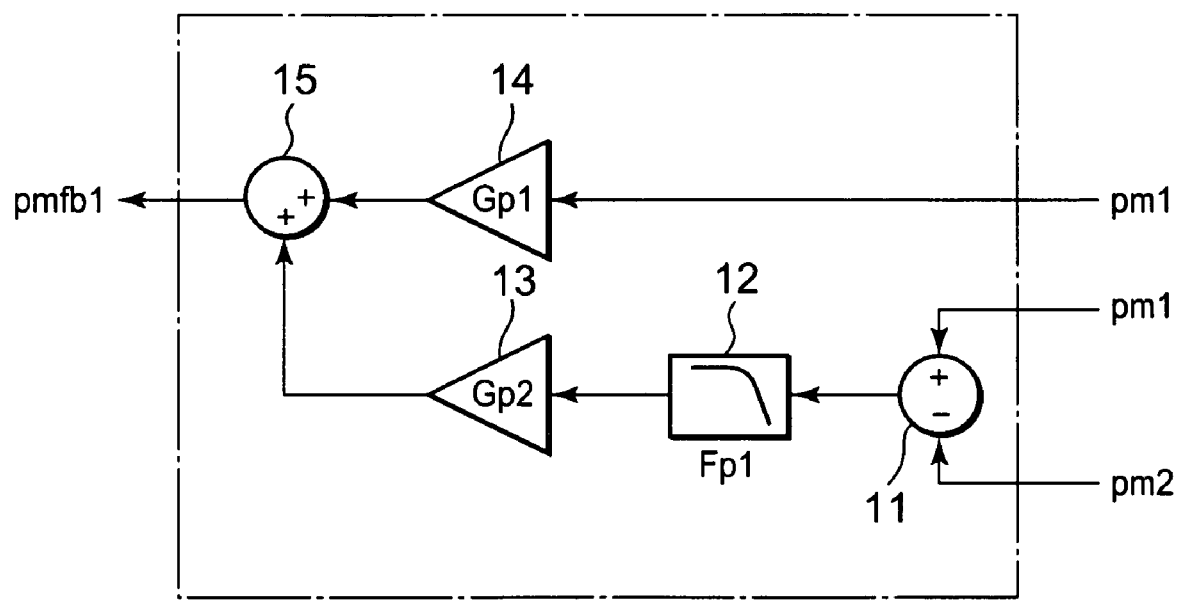
FIG. 5 is a diagram illustrating the configuration of a position feedback correction unit 3 in a first-axis servo controller 102a relevant to Embodiment 1 of the invention.

Next, the configuration and operations of the position feedback correction unit 3 in the first-axis servo controller 102a will be described according to FIG. 5.

A subtracter 11 calculates a deviation between the first-axis actual position pm1 and the second-axis actual position pm2 (=between-axes positional deviation), and a coefficient multiplier 13 multiplies by a coefficient Gp2 the deviation value having been filtered through a filter 12. The product of the first-axis actual position pm1 and a coefficient Gp1 in a coefficient multiplier 14 and the value multiplied by the coefficient Gp2 in the coefficient multiplier 13 are added by an accumulator 15 to calculate the first-axis position feedback signal pmfb1.

The first-axis position feedback signal pmfb1 is subtracted from the position command pa1, and the result is used for positional control.

By using a low-pass filter for the filter 12 to which the between-axes positional deviation is inputted, high-frequency components can be prevented from passing, and vibrations are not likely to be generated compared with Patent Document 2 described above, whereby the gains can be more increased, and performance of suppressing the between-axes positional deviation can be enhanced.

Figure 6:
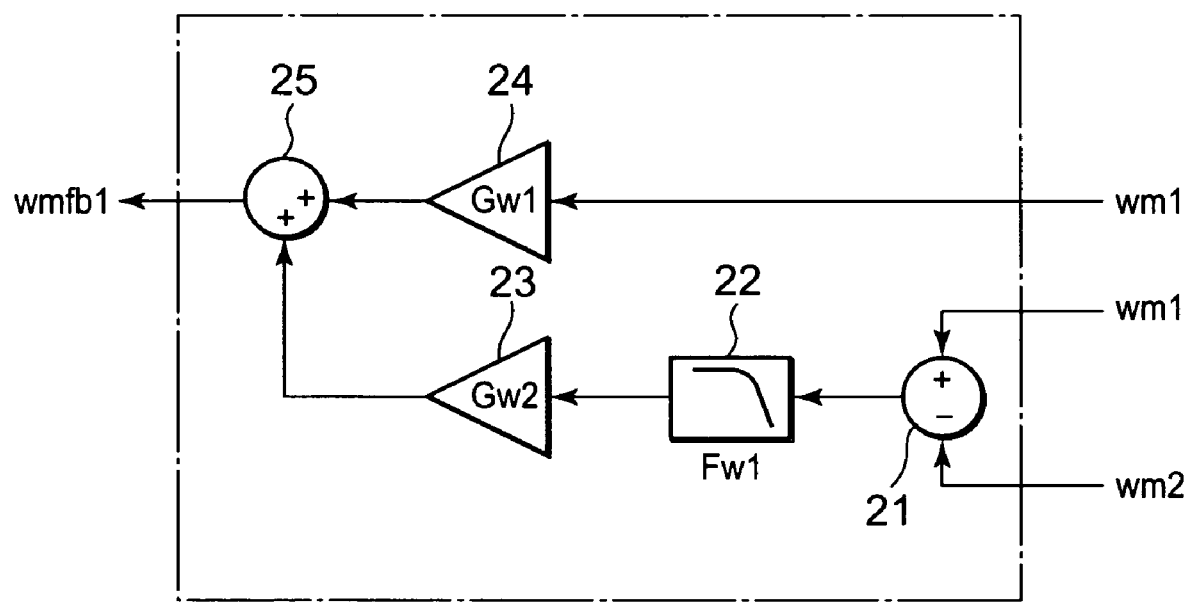
FIG. 6 is a diagram illustrating the configuration of a velocity feedback correction unit 6 in the first-axis servo controller 102a relevant to Embodiment 1 of the invention.

Next, the configuration and operations of the velocity feedback correction unit 6 in the first-axis servo controller 102a will be described according to FIG. 6.

A subtracter 21 calculates a deviation between the first-axis actual velocity wm1 and the second-axis actual velocity wm2 (=between-axes velocity deviation), and a coefficient multiplier 23 multiplies by a coefficient Gw2 the deviation value having been filtered through a filter 22. The product of the first-axis actual velocity wm1 and a coefficient Gw1 in a coefficient multiplier 24 and the value multiplied by the coefficient Gw2 in the coefficient multiplier 23 are added by an accumulator 25 to calculate the first-axis velocity feedback signal wmfb1.

The first-axis velocity feedback signal wmfb1 is subtracted from the velocity command wa1, and the result is used for velocity control.

By using a low-pass filter for the filter 22 to which the between-axes velocity deviation is inputted, high-frequency components can be prevented from passing, and vibrations are not likely to be generated compared with Patent Document 2 described above, whereby the gains can be more increased, and performance of suppressing the between-axes velocity deviation can be enhanced.

Next, another configuration and operations of the position feedback correction unit 3 will be described according to FIG. 7. If the coefficient Gp2 in the coefficient multiplier 13 and the coefficient Gp1 in the coefficient multiplier 14, which are illustrated in FIG. 5, are set so as to satisfy the equation Gp1=−Gp2>0, the configuration of the position feedback correction unit becomes approximately equivalent to that in FIG. 7.

The value of the first-axis actual position pm1 filtered through a high-pass filter 16, and the value of the first-axis actual position pm2 filtered through a low-pass filter 17 are added by an accumulator 18 to output the first-axis position feedback signal pmfb1.

Figure 7:
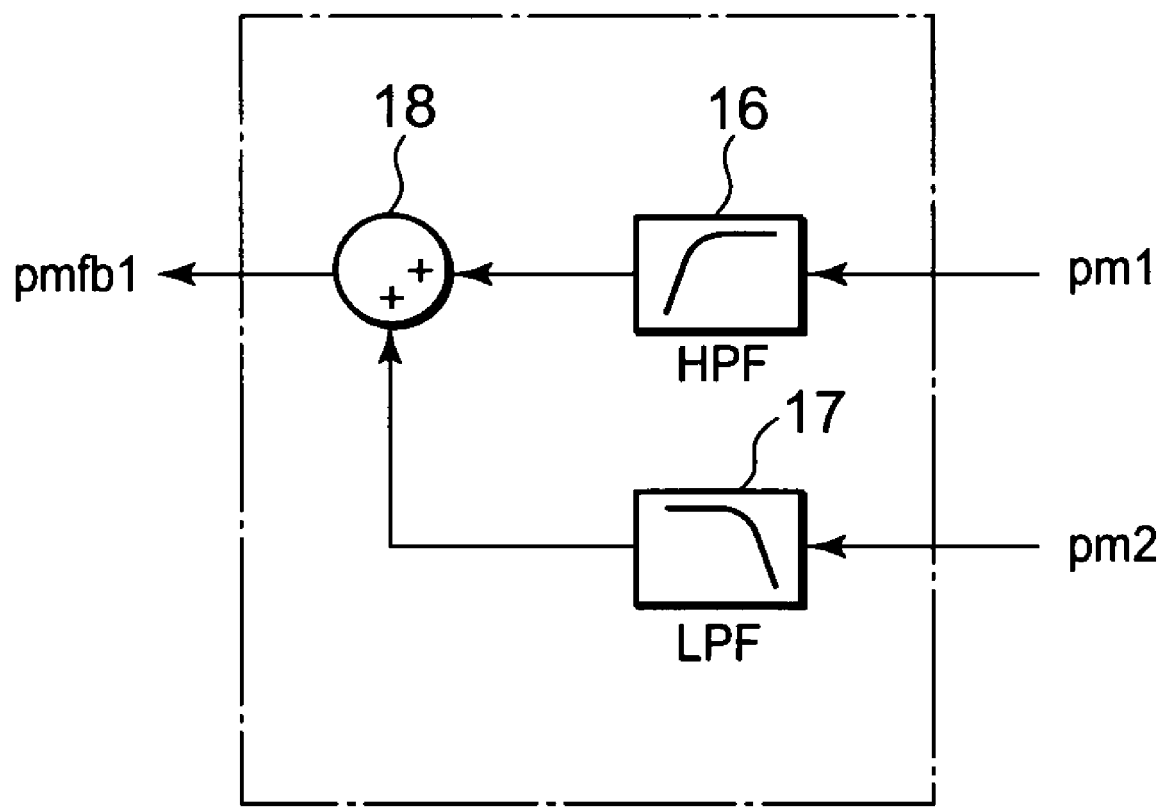
FIG. 7 is a diagram illustrating the configuration of another position feedback correction unit 3 in the first-axis servo controller 102a relevant to Embodiment 1 of the invention.

In the configuration in FIG. 7, the actual position of a self axis (the first axis) is fed back for high-frequency components, and the actual position of the other axis (the second axis) is fed back for low-frequency components. Consequently, because the control of this axis becomes similar to a master/slave control that performs positioning according to the position of the other axis, a conflict between axes cannot be generated even if errors in position detection are present.

Figure 8A:
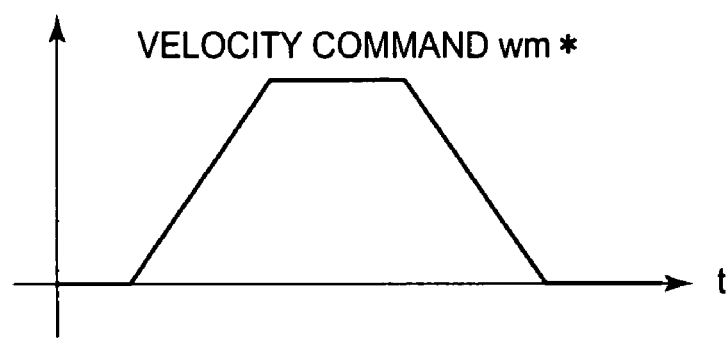
FIG. 8 is a diagram illustrating an example of gain change in the position feedback correction unit 3 in the first-axis servo controller 102a relevant to Embodiment 1 of the invention.
Figure 8B:
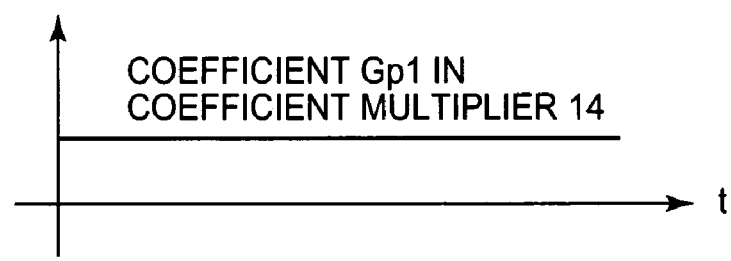
Figure 8C:
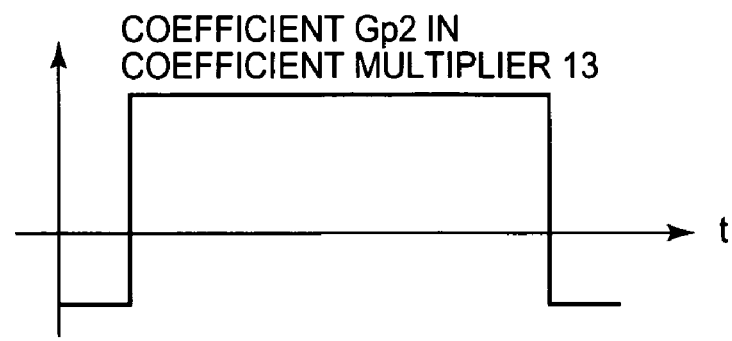

An example of changing the coefficient Gp2 in the coefficient multiplier 13 and the coefficient Gp1 in the coefficient multiplier 14 in the position feedback correction unit 3 will be described according to FIG. 8. FIG. 8($a$) is a diagram illustrating change of the velocity command, FIG. 8($b$) is a diagram illustrating change of the coefficient Gp1 in the coefficient multiplier 14, and FIG. 8($c$) is a diagram illustrating change of the coefficient Gp2 in the coefficient multiplier 13.

Because the between-axes positional deviation arises while the velocity command is generated, the between-axes positional deviation is suppressed by the coefficient Gp2>0 in the coefficient multiplier 13 as illustrated in FIG. 8($c$); and the coefficients are set to Gp2=−Gp1=−1 just before stopping and after stopping, and the control is changed to the master/slave control to prevent a conflict between axes.

Variable coefficients in the coefficient multipliers 13 and 14 enables the configuration of the controller to change easily, and a conflict between axes can be prevented while the between-axes positional deviation being suppressed.

Next, another configuration and operations of the velocity feedback correction unit 6 will be described according to FIG. 9. If the coefficient Gw2 in the coefficient multiplier 23 and the coefficient Gw1 in the coefficient multiplier 24, which have been illustrated in FIG. 6, are set so as to satisfy the equation Gw1=−Gw2>0, the configuration of the velocity feedback correction unit becomes approximately equivalent to that in FIG. 9.

The value of the first-axis actual velocity wm1 filtered through a high-pass filter 26 and the value of the first-axis actual velocity wm2 filtered through a low-pass filter 27 are added by an accumulator 28 to output the first-axis velocity feedback signal wmfb1.

Figure 9:
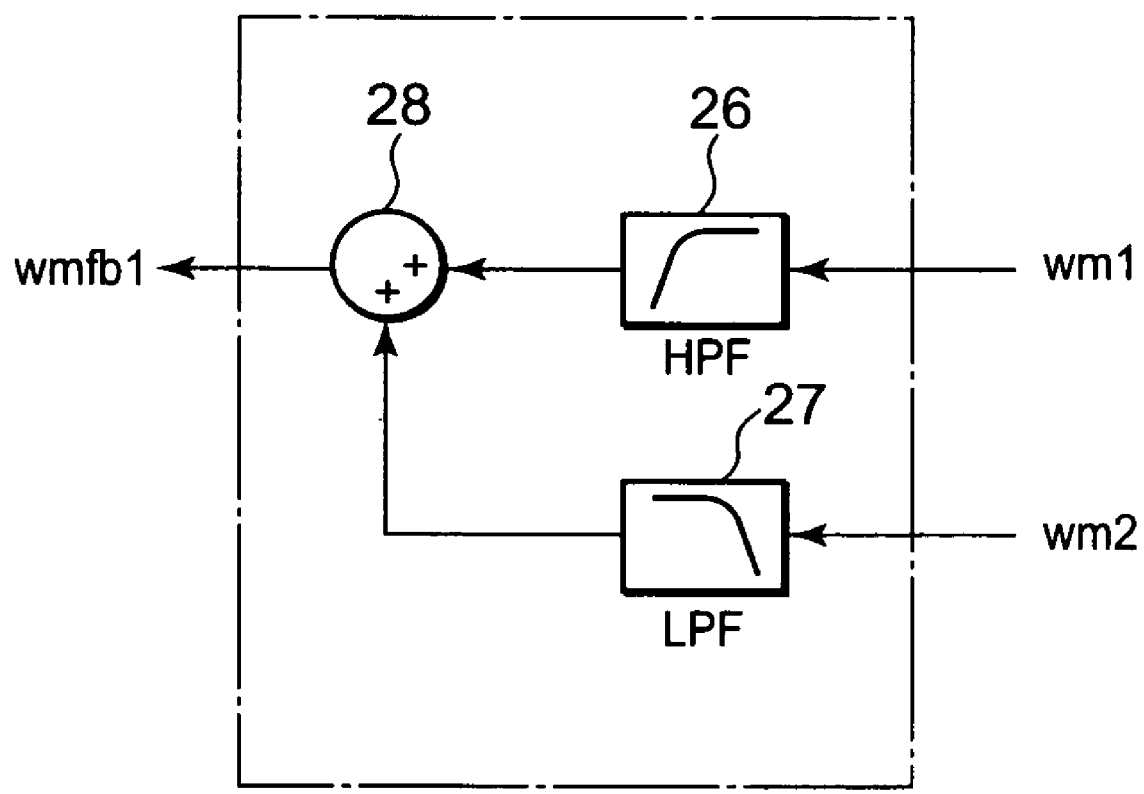
FIG. 9 is a diagram illustrating the configuration of another velocity feedback correction unit 6 in the first-axis servo controller 102a relevant to Embodiment 1 of the invention.

In the configuration in FIG. 9, the actual velocity of a self axis (the first axis) are fed back for high-frequency components, and the actual velocity of the other axis (the second axis) are fed back for low-frequency components. Consequently, because the control of this axis becomes similar to a master/slave control that performs determining the velocity according to the velocity of the other axis, a conflict between axes cannot be generated even if errors in velocity detection are present.

Because the servo controller according to Embodiment 1 performs correction for both the positional deviation and the velocity deviation, when the servo controller is applied to control of biaxial driving machine, comparable effects can be achieved using lower gains compared with those in Patent Document 2 described above, whereby the between-axes positional deviation of the machine can be suppressed with more stability.

Moreover, because the configuration is so that high-frequency components in the between-axes positional deviation can be prevented from passing, vibrations are not likely to be generated compared with Patent Document 2 described above, and the servo controller can be applied to a lower-rigidity machine.

Furthermore, the system can be easily changed to the master/slave control, the conflict between axes can be prevented, and the servo controller can be applied even to a machine in which detection errors are present.

The servo controller relevant to Embodiment 1 can easily replace a conventional servo controller because the present servo controller can be achieved only by adding a position feedback correction unit and a velocity feedback correction unit to a part that has conventionally carried out a position feedback operation and a velocity feedback operation. Moreover, a single configuration can be changed to a variety of control structures, which leads to the reduction of the software load.

Meanwhile, in Embodiment 1 described above, although an example having the configuration including a reference model control unit for calculating, based on the position command, the model position, the model velocity, and the model acceleration has been described, in which the position control unit performs positional control using the difference between the model position and the corrected position feedback signal outputted from the position feedback correction unit to output the velocity command, and the velocity control unit outputs the feedback torque command, based on the velocity command outputted from the position control unit, the model velocity, and the corrected velocity feedback signal, the reference model control unit does not always have to be used. However, when command pulses are coarse, or when the position command rapidly changes, the target-value response can be enhanced by using the reference model control unit.

Embodiment 2

Figure 10:
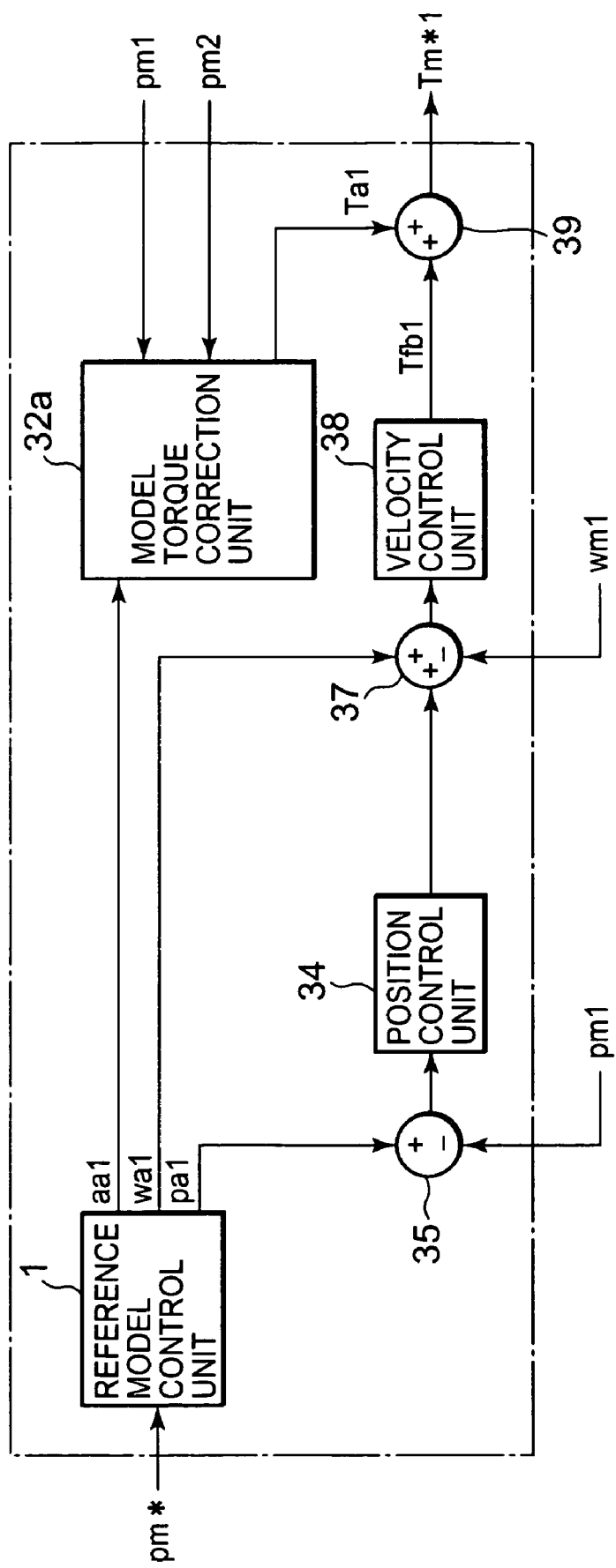
FIG. 10 is a diagram illustrating the configuration of a servo controller used in a biaxial driving machine relevant to Embodiment 2 of the invention.

The configuration and operations of the servo controller according to Embodiment 2 will be described according to FIG. 10, taking the first-axis servo controller 102a as an example.

The position command pm* outputted from the position command output device 101 (not illustrated) is inputted to a reference model control unit 1, which calculates and outputs a model position pa1, a model velocity wa1, and a model acceleration aa1.

A model torque correction unit 32a outputs a model torque Ta1 according to the model acceleration aa1, a first-axis actual position pm1 as the self-axis position, and a second axis actual position pm2 as the other-axis position.

The difference between the model position pa1 and the first axis actual position pm1 as the self-axis position is inputted from a subtracter 35 to a position control unit 34, which performs positional control, and outputs a velocity command.

A computing unit 37 adds the model velocity wa1 and the velocity command outputted from the position control unit 34, and subtracts the first-axis actual velocity wm1 as a self-axis velocity from the result, and outputs the corrected velocity command.

A velocity control unit 38 outputs a feedback torque command Tfb1 based on the velocity command outputted from the computing unit 37.

An accumulator 39 adds the feedback torque command Tfb1 and the model torque Ta1 outputted from the model torque correction unit 32a, and outputs the result as a torque command Tm*1 for the first axis.

The first-axis servo controller according to Embodiment 2 has a configuration in which the model torque calculation unit 2 in the first-axis servo controller according to Embodiment 1 is replaced with the model torque correction unit 32a.

The servo controller according to Embodiment 2 is configured so that actual position information on each other's axis is exchanged. An example in which the second-axis position pm2 is used in the first-axis servo controller 102a has been described using FIG. 10.

Figure 11:
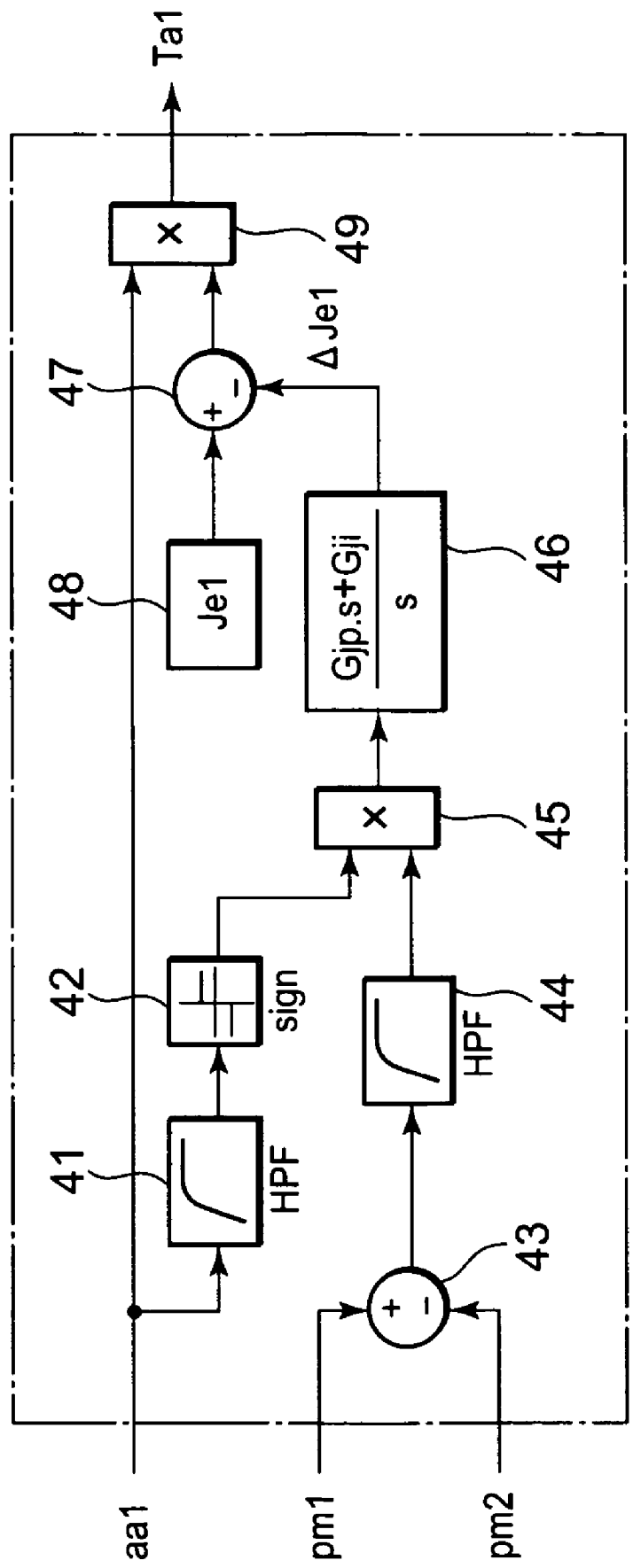
FIG. 11 is a diagram illustrating the configuration of a model torque correction unit 32a in a first-axis servo controller 102a relevant to Embodiment 2 of the invention.

Next, the configuration and operations of the model torque correction unit 32a will be described according to FIG. 11.

The model acceleration aa1 outputted from the reference model control unit 1 (not illustrated) is filtered through a high-pass filter 41, and then the sign of the model acceleration is detected by a sign detector 42.

The deviation between the first-axis actual position pm1 and the second-axis actual position pm2 calculated by a subtracter 43 is filtered through a high-pass filter 44, and a multiplier 45 multiplies the deviation value by the sign of the model acceleration detected by the sign detector 42 and outputs the value to a PI corrector 46.

The PI corrector 46 performs PI correction using a proportional gain Gjp and an integral gain Gji, and outputs an inertia correction value ΔJe1.

A subtracter 47 subtracts the inertia correction value ΔJe1 from a model inertia value Je1 designated in a nominal coefficient 48.

A multiplier 49 multiplies the model acceleration aa1 outputted from the reference model control unit 1 (not illustrated) by the value calculated in the subtracter 47, to obtain the corrected model torque Ta1.

In the model torque correction unit 32a in the first-axis servo controller 102a according to Embodiment 2, when the model inertia value Je1 designated in the nominal coefficient 48 coincides with the actual driving inertia, the servo controller operates, according to the model torque Ta1, so that the actual position approximately coincides with the model position.

Meanwhile, when the model inertia value Je1 includes an error, the correction is performed according to the between-axes positional deviation so as to coincide with the actual inertia. For example, if the upper structure is present on the opposite side, and the actual inertia is smaller than the model inertia value Je1 due to load unbalance, when the change in the acceleration is positive, a positive between-axes positional deviation arises, and when the change in the acceleration is negative, a negative between-axes positional deviation arises. Accordingly, by inverting, using polarity of the model acceleration aa1 filtered through the high-pass filter, the corrected between-axes positional deviation to be inputted, the correction is performed always in the direction in which the model inertia is decreased, in other words, in the direction in which the model inertia coincides with the actual inertia. According to the correction, the control is performed so that the first-axis position coincides with the second-axis position, and the between-axes positional deviation is suppressed.

Moreover, in some cases, depending on the condition of the controller or the machine, a positive between-axes positional deviation arises during acceleration, and a negative between-axes positional deviation arises during deceleration. In such cases, if a small value such as zero is given for the gain in the high-pass filter, the model inertia value is always corrected in the same manner, and the between-axes positional deviation is suppressed.

The gains in the high-pass filter and in the PI corrector are determined in accordance with responses of the reference model controller, of the position control unit, and of the velocity control unit, and with the system configuration; however, depending on the condition, the gain in the high-pass filter can be zero, with the high-pass filter being a direct term.

Figure 12A:
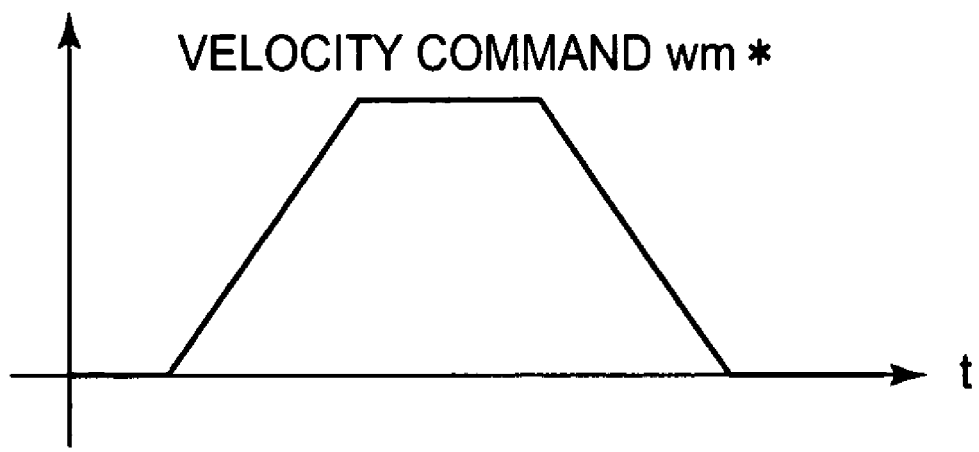
FIG. 12 is a diagram illustrating an example of gain change in a proportional gain Gjp and in an integral gain Gji that are used for PI correction in a PI corrector 46 in the model torque correction unit 32a in the first-axis servo controller 102a relevant to Embodiment 2 of the invention.
Figure 12B:
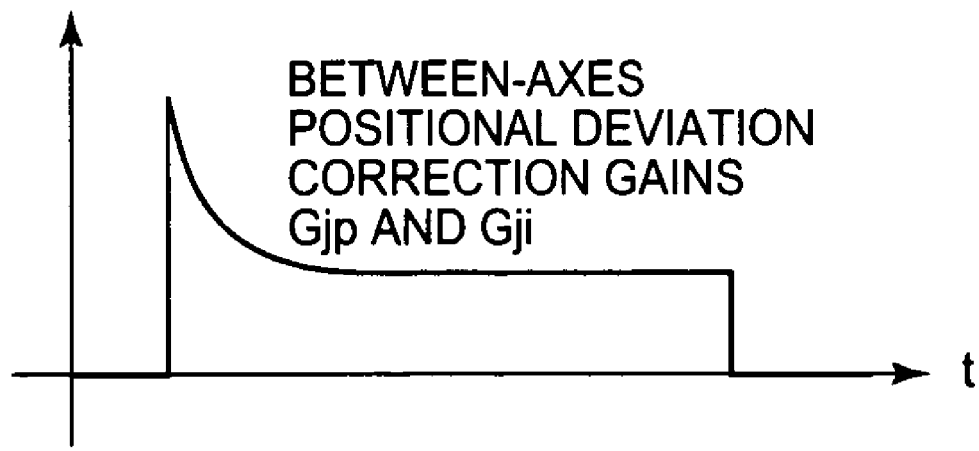

An example of gain change in the proportional gain Gjp and in the integral gain Gji that are used for PI correction in the PI corrector 46 will be described using FIG. 12. FIG. 12(a) is a diagram illustrating changing of the velocity command, and FIG. 12(b) is a diagram illustrating changing of the proportional gain Gjp and the integral gain Gji.

Because large values of the between-axes positional deviation arise during acceleration or deceleration, and at the starting point and the ending point of the acceleration/deceleration, PI correction gains are set as variable gains, which are, for example, increased in their vicinity.

An example is illustrated in FIG. 12, in which the PI gains are zero during operational stops, the gains are increased to the maximum at the moment when the velocity command wm* is inputted, and are then monotonically decreased to stabilize at a steady value in a certain period. Configured as described above, because more corrections are made during the period while a lot of important signals for correction are inputted, the controller is not likely to be influenced by the noise, disturbances, or the like, and the computational accuracy in computing the corrected inertia can be enhanced.

Although an example has been described using FIG. 12, in which gains are increased at points where large values of the between-axes positional deviation arise, for example, during acceleration or deceleration, or in the vicinity of the starting point and the ending point of the acceleration/deceleration, when an operation sequence of the upper structure or the like is known in advance, by applying variable gains in accordance with points in time along the sequence, computational accuracy can be likewise enhanced.

Figure 13A:
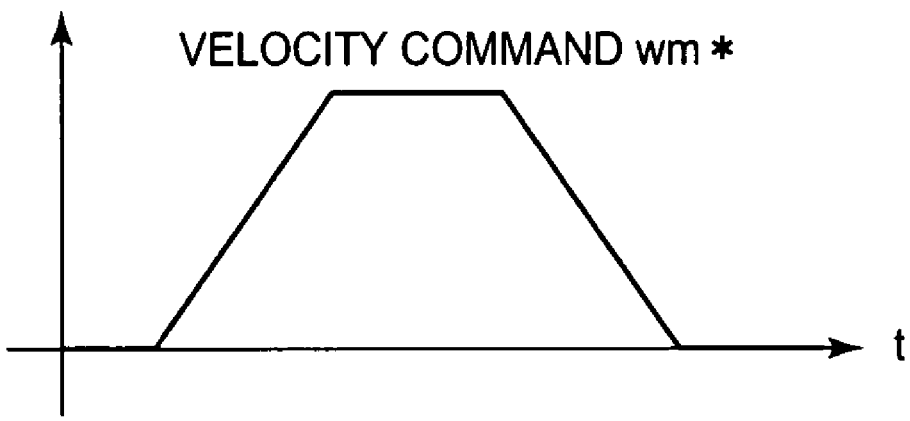
FIG. 13 is a diagram illustrating another example of gain change in the proportional gain Gjp and in the integral gain Gji that are used for PI correction in the PI corrector 46 in the model torque correction unit 32a in the first-axis servo controller 102a relevant to Embodiment 2 of the invention.
Figure 13B:
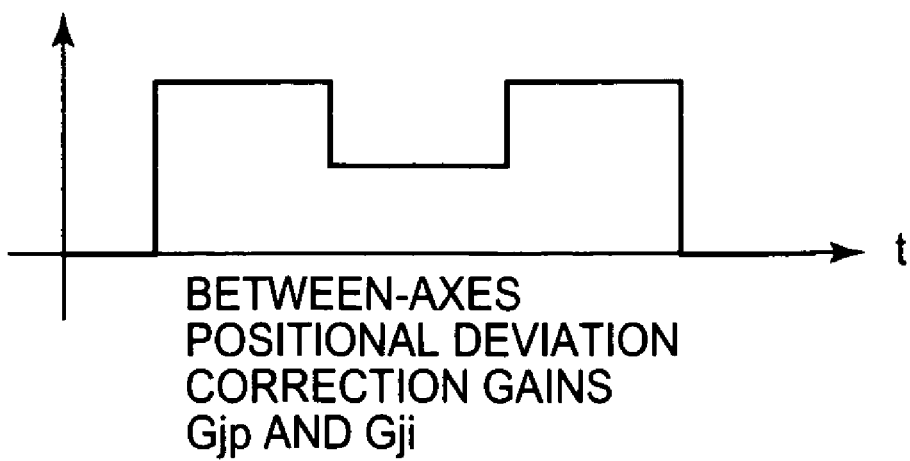
Figure 14A:
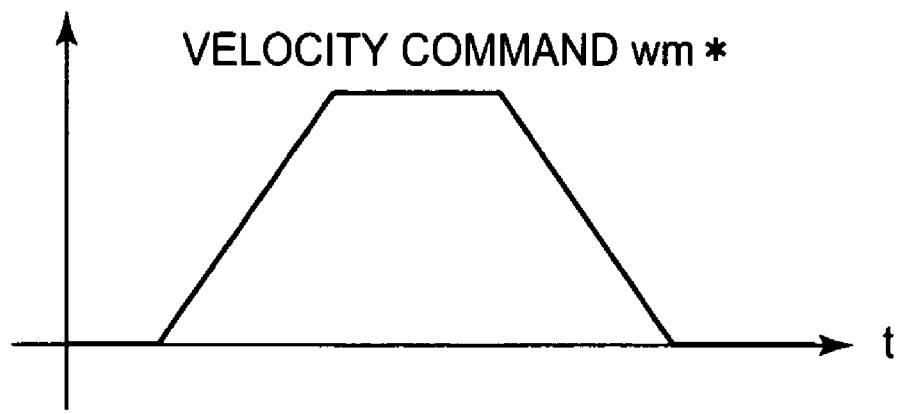
FIG. 14 is a diagram illustrating another example of gain change in the proportional gain Gjp and in the integral gain Gji that are used for PI correction in the PI corrector 46 in the model torque correction unit 32a in the first-axis servo controller 102a relevant to Embodiment 2 of the invention.
Figure 14B:
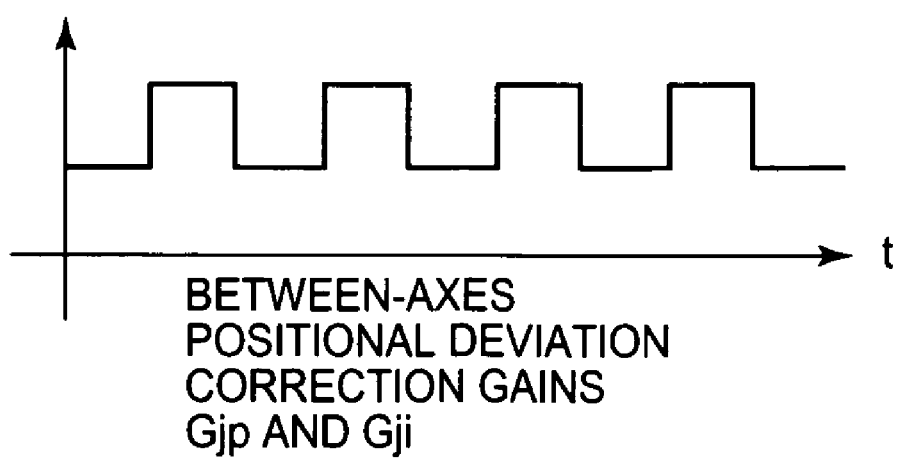

Other examples of changing gains will be described according to FIG. 13 and FIG. 14. FIG. 13(a) is a diagram illustrating changing of the velocity command, and FIG. 13(b) is a diagram illustrating changing of the proportional gain Gjp and the integral gain Gji. Meanwhile, FIG. 14(a) is a diagram illustrating changing of the velocity command, and FIG. 14(b) is a diagram illustrating changing of the proportional gain Gjp and the integral gain Gji.

FIG. 13 illustrates an example of changing gains, in cases where the between-axes positional deviation is large during acceleration and during deceleration, which is effective for enhancing accuracy of correction computing and for suppressing the between-axes positional deviation.

Meanwhile, FIG. 14 illustrates an example of changing gains, in cases where the between-axes positional deviation is large at the starting point and the ending point of acceleration/deceleration, which is effective for enhancing precision of correction computing and for suppressing the between-axes positional deviation.

The model torque correction unit 32a is not limited to the system described above, and systems are available in which, for example, P control or PID control instead of the PI corrector 46, phase-lead compensation, or statistical methods typified by a successive least square method are used. Moreover, although an example has been described above, in which the between-axes positional deviation filtered through a high-pass filter is used, the positional deviation can be directly used, or an insensitive zone can be set for the between-axes positional deviation.

When the servo controller according to Embodiment 2 is applied to control of a biaxial driving machine, factors generating the between-axes positional deviation are corrected directly and in real time, whereby the between-axes positional deviation can be suppressed even when the load unbalance changes due to movement or the like of the upper structure of the moving table.

Moreover, because, unlike in Patent Document 2 described above, the correction is performed in the feedforward side, the between-axes positional deviation can be suppressed stably and speedily without setting gains at a high level, whereby the servo controller can be used for a machine that does not have high rigidity. Furthermore, because computing according to mathematical formulas is not necessary when PI correction or the like is used, suppression effects can be achieved by small amount of calculation, and the servo controller can be easily applied to a machine in which machine constants such as the distance between two axes, the rigidities of the axes, and the masses of components cannot be acquired precisely.

The servo controller according to Embodiment 2 can easily replace a conventional servo controller because the present servo controller can be achieved only by changing a model torque computing part that has conventionally been a coefficient multiplier to the model torque correction unit.

In addition, by applying variable gains in accordance with velocity commands and points in time, precision in computing corrected inertia values can be more enhanced, and performance of suppressing between-axes positional deviation can be enhanced.

Meanwhile, in Embodiment 2 described above, although an example having the configuration including a reference model control unit for calculating, based on the position command, the model position, the model velocity, and the model acceleration, wherein the velocity control unit outputs the feedback torque command, based on the velocity command outputted from the position control unit, on the model velocity, and on the self-axis velocity, has been described, the model velocity does not always have to be used. However, in use for high acceleration/deceleration commands, the performance of suppressing the between-axes positional deviation can be enhanced by using the model velocity.

Embodiment 3

Figure 15:
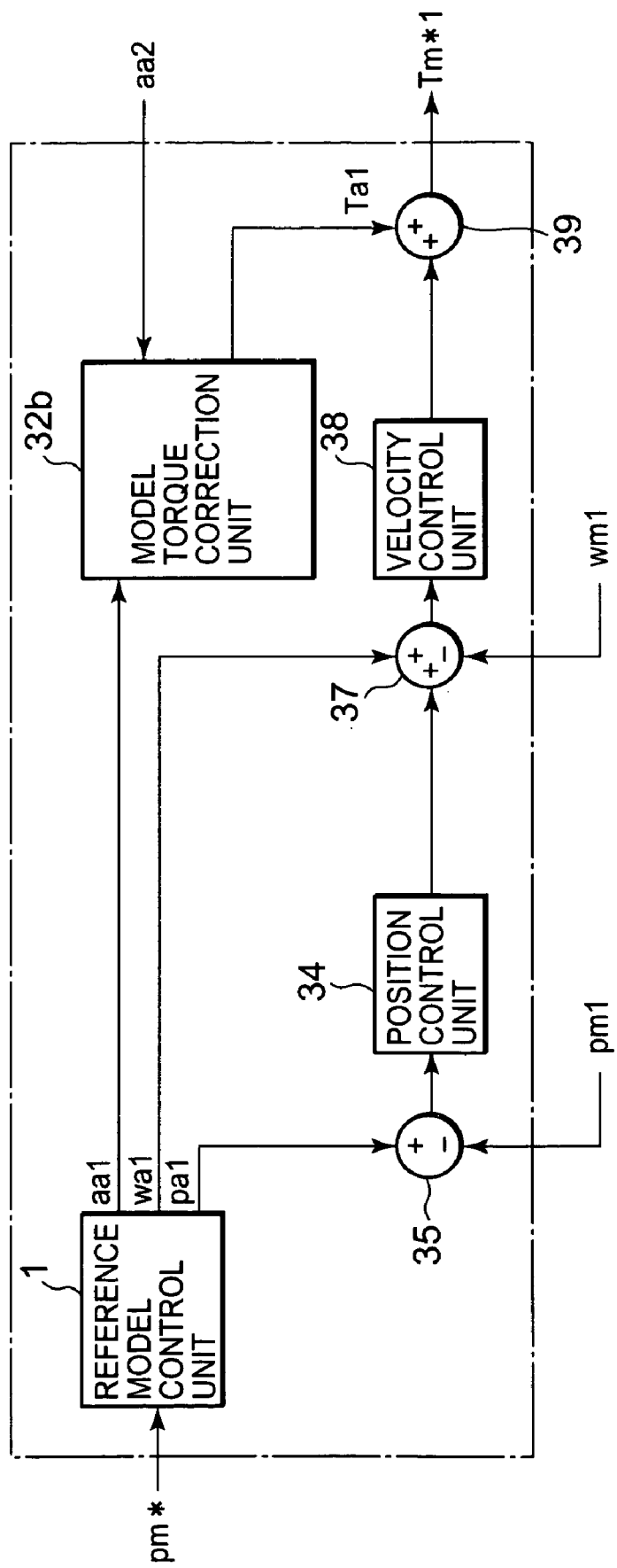
FIG. 15 is a diagram illustrating the configuration of a servo controller used in a biaxial driving machine relevant to Embodiment 3 of the invention.

The configuration and operations of a servo controller according to Embodiment 3 will be described according to FIG. 15, taking the first-axis servo controller 102a as an example. In FIG. 15, numerals 1 and 34 through 39 are the same as in FIG. 10, and the description thereof will be omitted.

The model torque correction unit 32b outputs the corrected model torque Ta1 based on the first-axis model acceleration aa1 outputted from the reference model control unit 1, and on the second-axis model acceleration aa2 outputted from the reference model control unit for the second-axis servo controller (not illustrated).

The servo controller according to Embodiment 3 is configured so that information on each other's model acceleration is exchanged. An example in which the second-axis model acceleration aa2 is used in the first-axis servo controller 102a has been described using FIG. 15.

The configuration and operations of the model torque correction unit 32b will be described according to FIG. 16.

The first-axis model acceleration aa1 outputted from the reference model control unit 31, multiplied by a coefficient J11 in a coefficient multiplier 51, and the second-axis model acceleration aa2 outputted from the reference model control unit for the second-axis servo controller (not illustrated), multiplied by a coefficient J12 in a coefficient multiplier 52, are added in an accumulator 53, to output the corrected model torque Ta1, where J11 is a self inertia designated in the coefficient multiplier 51, and J12 is an interactive inertia designated in the coefficient multiplier 52.

In addition, for the machine inertias in the biaxial driving machine having the configuration illustrated in FIG. 1, under the condition that the first-axis inertia is J1, the second-axis inertia is J2, the moving-table inertia is J3, the upper-structure inertia is J4, and the rotation moment around the center of gravity, that can be calculated from these four inertias, is J0, setting up equations of motion, the self inertia J11 and the interactive inertia J12 can be calculated according to the following equations.

$$J11 = J1 + J3/4 + (1/2 - x/L)^2 \cdot J4 + J0/L^2$$

$$J12 = J1 + J3/4 + (1/2 - x/L)^2 \cdot J4 - J0/L^2$$

where, L is the distance between the axes, and x is the distance from the center location between the axes to the center location of the upper structure.

Figure 16:
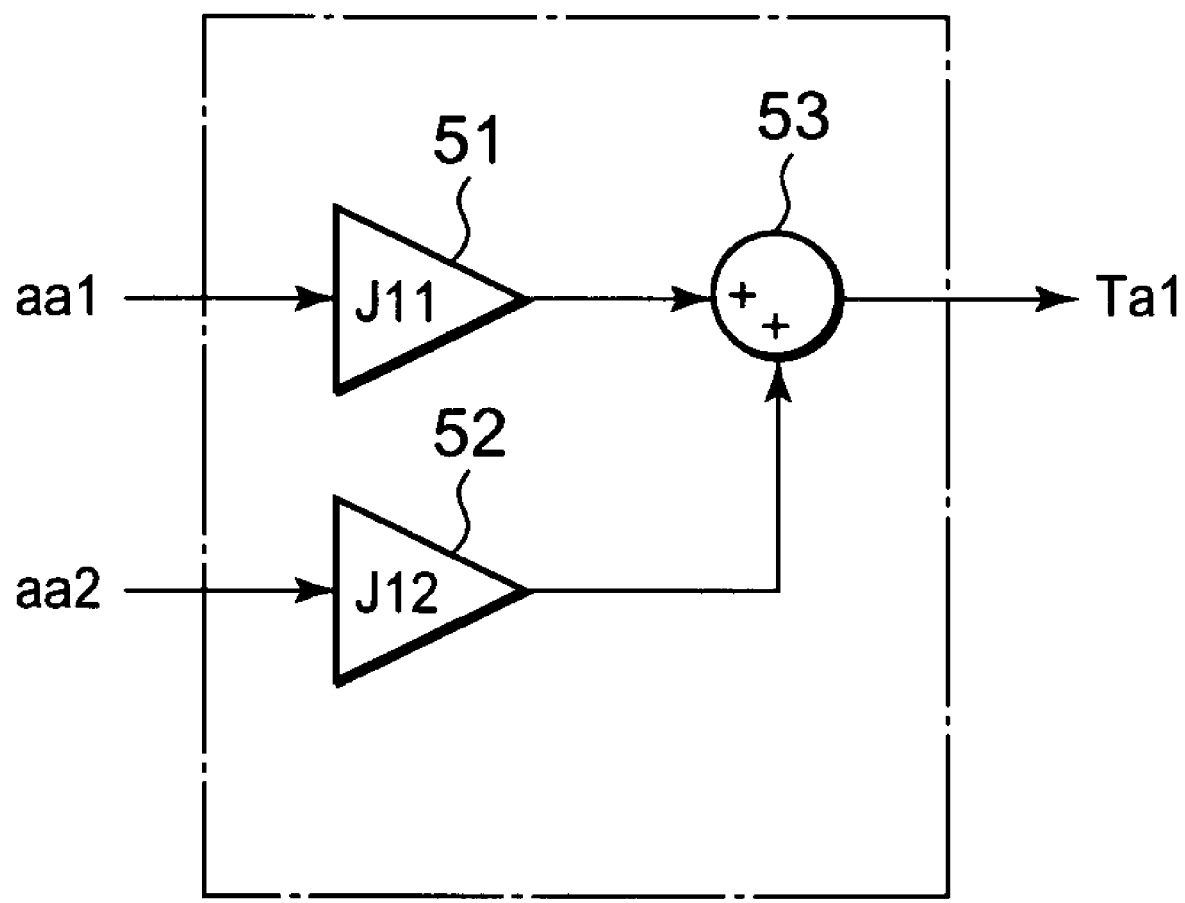
FIG. 16 is a diagram illustrating the configuration of a model torque correction unit 32b in a first-axis servo controller 102a relevant to Embodiment 3 of the invention.

Accordingly, by setting J11 in the coefficient multiplier 51 and J12 in the coefficient multiplier 52 in FIG. 16 at values in the equations above, in the same way as in Embodiment 2 described above, an appropriate model torque for matching the actual position with the model position can be acquired, and the first-axis position and the second-axis position are controlled in the direction so as to coincide with each other, whereby the between-axes positional deviation can be suppressed.

In addition, when the load distribution of the moving table is fixed, preset values of the coefficient multiplier 51 and the coefficient multiplier 52 can be set as fixed numbers; however, when the load distribution of the moving table varies in cases, for example, in which the position of the upper structure is changed, the preset values can be modified from an upper controller or the like. For example, a method of setting the preset values by receiving the value of x (the distance from the center location of the axes to the center location of the upper structure) in the equations above and by performing computation, and a method of modifying the values by computing the inertia values in the upper controller and receiving parameters are conceivable.

When the servo controller relevant to Embodiment 3 is applied to control of a biaxial driving machine, the positional deviation between axes can be suppressed according to the operations described above. Moreover, because the correction is performed completely only by feedforward portions, there is a benefit in that, even if, for example, the preset values of gains are wrong, the controller can never be unstable. In cases in which the mechanical constants are known in advance, or in which the information can be obtained from the upper controller or the like, the servo controller according to Embodiment 3 can reduce the software load of the servo controller side compared with Embodiment 1 and Embodiment 2.

Furthermore, the servo controller can easily replace a conventional servo controller likewise as in Embodiment 2, because the present servo controller can be achieved only by changing a model torque computing part that has conventionally been a coefficient multiplier to a correction feedforward unit.

Meanwhile, in Embodiment 3 described above, although an example of having the configuration including a reference model control unit for calculating, based on the position command, the model position, the model velocity, and the model acceleration, wherein the velocity control unit outputs the feedback torque command, based on the velocity command outputted from the position control unit, on the model velocity, and on the correction velocity feedback signal outputted from the velocity feedback correction unit, has been described, the model velocity does not always have to be used. However, in use for high acceleration/deceleration commands, the performance of suppressing the between-axes positional deviation can be enhanced by using the model velocity.

Embodiment 4

Figure 17:
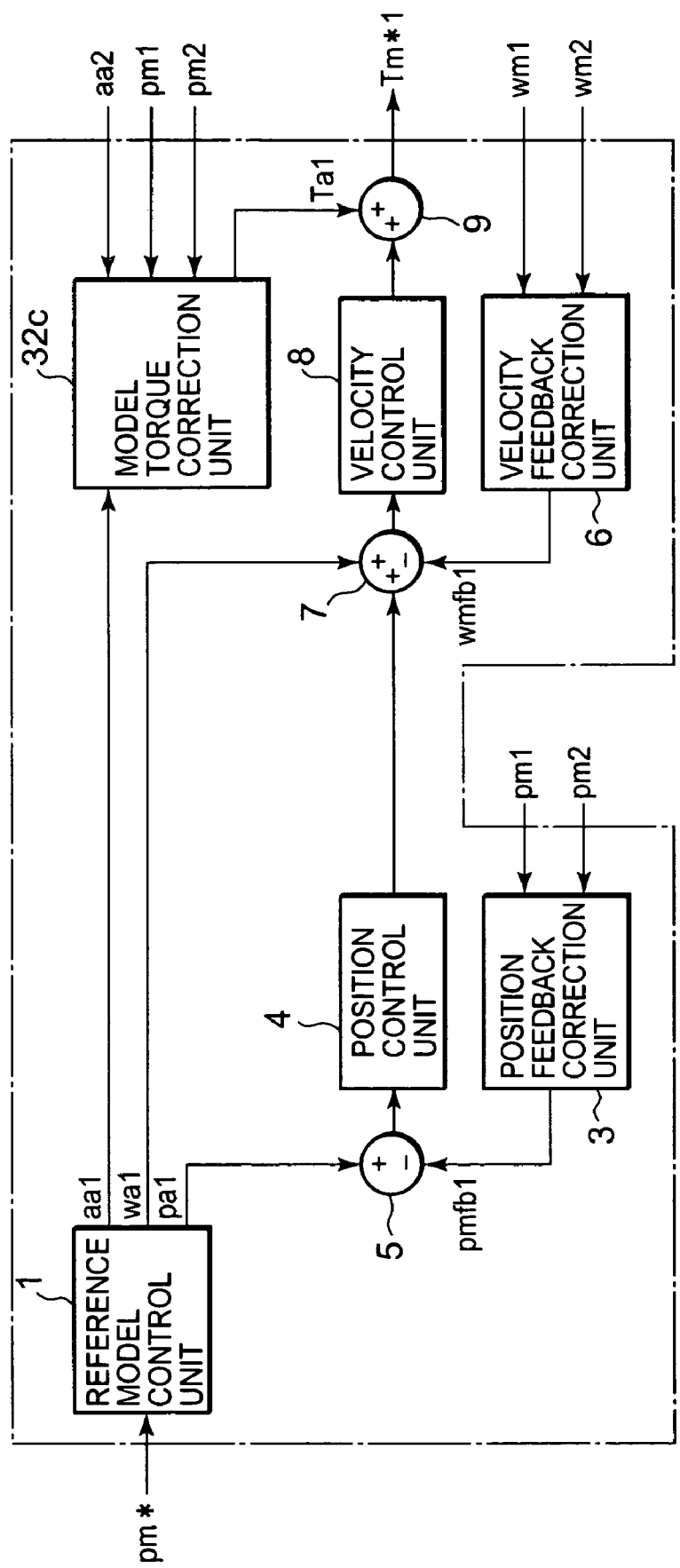
FIG. 17 is a diagram illustrating the configuration of a first-axis servo controller used in a biaxial driving machine relevant to Embodiment 4 of the invention.

The configuration and operations of a first-axis servo controller according to Embodiment 4 will be described according to FIG. 17. In FIG. 17, numerals 1 and 3 through 9 are the same as in FIG. 2, and the description thereof will be omitted.

The model torque correction unit 32c outputs the corrected model torque Ta1 based on the first-axis model acceleration aa1 outputted from the reference model control unit 1, on the second-axis model acceleration aa2 outputted from the reference model control unit for the second-axis servo controller (not illustrated), on the first-axis position pm1 as the self-axis position, and on the second-axis position pm2 as the other-axis position.

Figure 18:
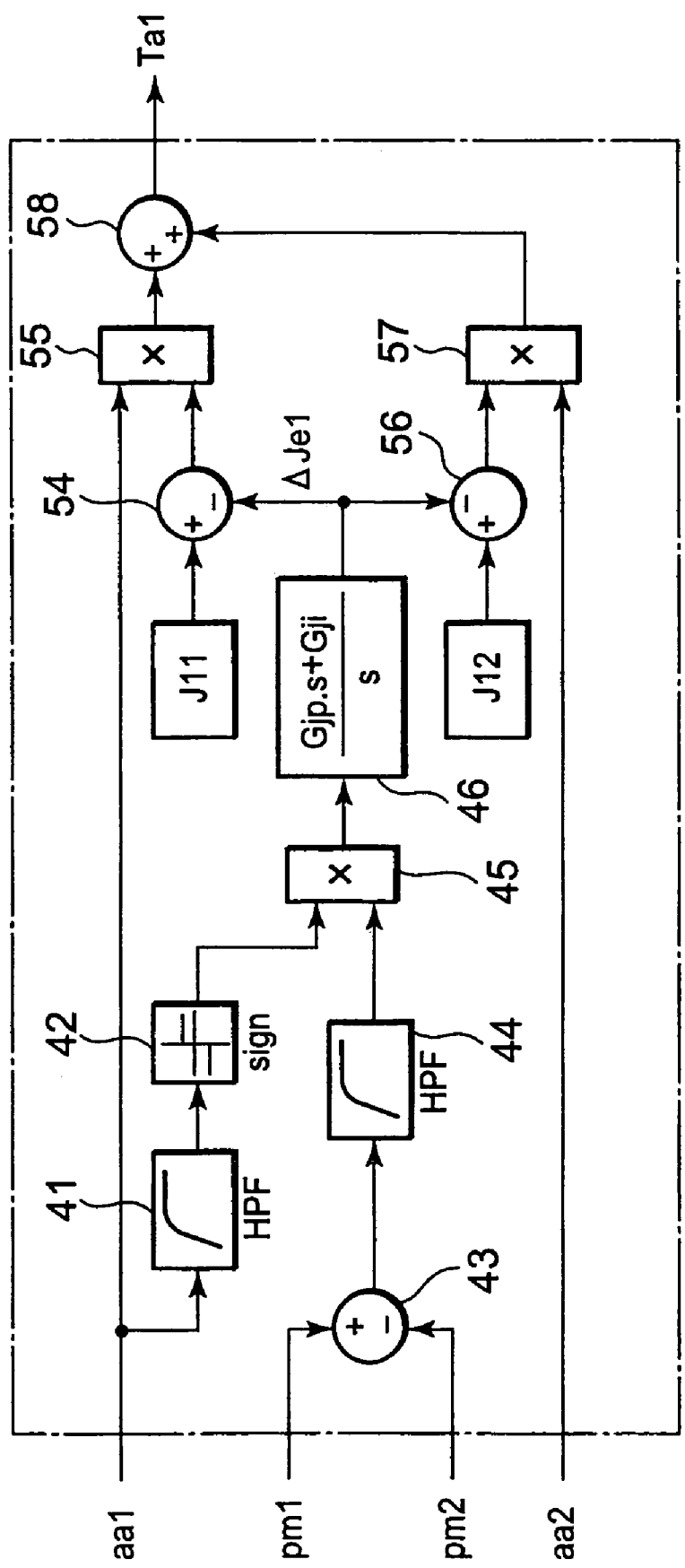
FIG. 18 is a diagram illustrating the configuration of a model torque correction unit 32c in a first-axis servo controller 102a relevant to Embodiment 4 of the invention.

The configuration and operations of the model torque correction unit 32c will be described according to FIG. 18. In FIG. 18, numerals 41 through 46 are the same as in FIG. 11, and the description thereof will be omitted.

The PI corrector 46 performs PI correction using a proportional gain Gjp and an integral gain Gji, and outputs an inertia correction value $\Delta Je1$.

A subtracter 54 subtracts the inertia correction value $\Delta Je1$ from the self inertia J11, and a multiplier 55 multiplies the model acceleration aa1 outputted from the reference model control unit 1 (not illustrated) by the value calculated in the subtracter 54. A subtracter 56 subtracts the inertia correction value $\Delta Je1$ from the interactive inertia J12, and a multiplier 57 multiplies the second-axis model acceleration aa2 outputted from the reference model control unit in the second-axis servo controller (not illustrated) by the value calculated in the subtracter 56. Here, the same values as designated in the nominal coefficient multiplier 51 and the nominal coefficient multiplier 52 in FIG. 16 are used for the self inertia J11 and the interactive inertia J12.

An accumulator 58 adds the value calculated in the multiplier 55 and the value calculated in the multiplier 57 to obtain the corrected model torque Ta1.

In the model torque correction unit 32c in the first-axis servo controller according to Embodiment 4, the self inertia J11 is corrected by subtracting the inertia correction value $\Delta Je1$ calculated in the PI corrector 46, and the interactive inertia J12 is corrected by adding the inertia correction value ΔJe1 calculated in the PI corrector 46. These corrected values are multiplied by the model accelerations aa1 and aa2, respectively, and are then added to be the model torque Ta1.

In the first-axis servo controller relevant to Embodiment 4, load unbalance obtained in advance as mechanical constants is corrected according to the self inertia J11 and the interactive inertia J12 designated in the nominal coefficient multipliers 51 and 52, likewise as in Embodiment 3. However, an unbalance portion generated when the mechanical constants are a little off is corrected according to the inertia correction value ΔJe1 obtained by the PI corrector 46, likewise as in Embodiment 2. The correction of the inertias effectively suppresses the between-axes positional deviation. The remaining between-axes positional deviation that has not been completely suppressed by the correction, likewise as in Embodiment 1, is suppressed in the position feedback correction unit 3 and in the velocity feedback correction unit 6. According to the above, an enormous effect in suppressing the between-axes positional deviation can be achieved.

When the first-axis servo controller according to Embodiment 4 is applied to control of a biaxial driving machine, load unbalance obtained in advance as mechanical constants is corrected by feedforward likewise as in Embodiment 3, and the unbalance portion generated when the constants are a little off is corrected likewise as in Embodiment 2, and the remaining between-axes positional deviation that has not been completely suppressed is corrected by feedback likewise as in Embodiment 1, whereby an enormous effect in suppressing the between-axes positional deviation can be achieved.

Moreover, because, by using technologies in Embodiment 1 through Embodiment 3 together, the PI correction gains in the model torque correction unit, and the gains in the position feedback correction unit and in the velocity feedback correction unit are not necessarily set at large values, a desired effect in suppressing the between-axes positional deviation can be stably achieved.

Meanwhile, for the first-axis servo controller according to Embodiment 4, an example has been described in which the technologies disclosed in Embodiment 1 through Embodiment 3 described. above are used together. However, only two of the technologies disclosed in Embodiment 1 through Embodiment 3 described above can be used together in accordance with use application. Furthermore, the technologies disclosed in Embodiment 1 through Embodiment 3 described above can be switched to be used in accordance with the velocity command or the time.

Moreover, although an example in which the servo controller involving the invention is used for a biaxial driving machine has been described in the explanation above, applicable targets are not limited to biaxial driving machines; and in case of multiple axes more than two axes, the servo controller can be applied, for example, using the positional deviation between the self position and the mean position of the multiple axes other than the self axis. Furthermore, the synchronization of the two axes included in the biaxial driving machine is not limited to 1:1, and, in case of 1:N, the servo controller is applicable likewise by multiplying the ratio as a coefficient.

Moreover, although an example in which ball screws are used as actuators, the actuators are not limited to ball screws.

Furthermore, as for a machine that uses a servo controller according to the invention, the servo controller is applicable in the same way to synchronous control of not only a direct acting type but also a rotating type or the like.

INDUSTRIAL APPLICABILITY

As described above, because the servo controller according to the present invention is applicable to a low-rigidity machine, or a biaxial driving machine in which position detection errors are present, the servo controller is suitable for synchronous control of a multiaxial driving machine.

What is claimed is:

1. A servo controller comprising:
   a position feedback correction unit for outputting a corrected position feedback signal by adding a between-axes positional deviation, filtered and gained, that is the difference between a self-axis position and another-axis position, to a self-axis position to which a gain is applied;
   a position control unit for performing, according to the corrected position feedback signal outputted from the position feedback correction unit, positional control to output a velocity command; and
   a velocity control unit for outputting a feedback torque command based on the velocity command outputted from the position control unit, and a self-axis velocity.

2. A servo controller according to claim 1, wherein, in the position feedback correction unit, the gain applied to the between-axes positional deviation is set at a negative value during operational stops, and is set at a positive value during operational runs.

3. A servo controller according to claim 2, further comprising a velocity feedback correction unit for outputting a corrected velocity feedback signal by adding a between-axes velocity deviation, filtered and gained, that is the difference between the self-axis velocity and another axis velocity, to a self-axis velocity to which a gain is applied;
   wherein the velocity control unit outputs the feedback torque command based on the velocity command outputted from the position control unit, and the corrected velocity feedback signal outputted from the velocity feedback correction unit.

4. A servo controller according to claim 1, further comprising a velocity feedback correction unit for outputting a corrected velocity feedback signal by adding a between-axes velocity deviation, filtered and gained, that is the difference between the self-axis velocity and another axis velocity, to a self-axis velocity to which a gain is applied;
   wherein the velocity control unit outputs the feedback torque command based on the velocity command outputted from the position control unit, and the corrected velocity feedback signal outputted from the velocity feedback correction unit.

5. A servo controller comprising:
   a position feedback correction unit for correcting a position feedback signal by adding a self-axis position filtered through a high-pass filter and an other-axis position filtered through a low-pass filter;
   a position control unit for performing, according to a corrected position feedback signal outputted from the position feedback correction unit, positional control to output a velocity command; and
   a velocity control unit for outputting a feedback torque command based on the velocity command outputted from the position control unit, and on the self-axis velocity.

6. A servo controller according to claim 5, further comprising a velocity feedback correction unit for correcting a velocity feedback signal by adding a self-axis velocity filtered through a high-pass filter and an other-axis velocity filtered through a low-pass filter;

wherein the velocity control unit corrects the velocity feedback signal based on the velocity command outputted from the position control unit, and on a corrected velocity feedback signal outputted from the velocity feedback correction unit.

7. A servo controller comprising:

a reference model control unit for calculating, based on a position command, a model position and a model acceleration for simulating an ideal movement for a machine;

a position control unit for performing, according to the difference between the model position and a self-axis position, positional control to output a velocity command;

a velocity control unit for outputting a feedback torque command based on the velocity command outputted from the position control unit, and a self-axis velocity;

a model torque correction unit for correcting, according to the self-axis position and another-axis position, the model acceleration to calculate a model torque; and an accumulator for calculating a torque command based on the model torque and the feedback torque command.

8. A servo controller according to claim 7, wherein:

the reference model control unit is further for calculating, based on the position command, a model velocity for simulating the ideal movement for the machine; and the velocity control unit outputs the feedback torque command based on the velocity command outputted from the position control unit, the model velocity, and the self-axis velocity.

9. A servo controller according to claim 8, wherein, in the model torque correction unit, in accordance with time or with a waveform of the velocity command, the model torque correction unit's correction operation is started and stopped, or correction gains are changed.

10. A servo controller according to claim 9, wherein, the model torque correction unit calculates the model torque by correcting the model acceleration further based on the sign of the model acceleration.

11. A servo controller according to claim 7, wherein, in the model torque correction unit, in accordance with time or with a waveform of the velocity command, the correction unit's correction operation is started and stopped, or correction gains are changed.

12. A servo controller according to claim 11, wherein, the model torque correction unit calculates the model torque by correcting the model acceleration further based on the sign of the model acceleration.

13. A servo controller according to claim 7, wherein, the model torque correction unit calculates the model torque by correcting the model acceleration further based on the sign of the model acceleration.

14. A servo controller comprising:

a reference model control unit for calculating, based on a position command, a model position and a model acceleration for simulating an ideal movement for a machine;

a position feedback correction unit for outputting a corrected position feedback signal based on a self-axis position and another-axis position;

a position control unit for performing, according to a difference between the model position and the corrected position feedback signal outputted from the position feedback correction unit, positional control to output a velocity command;

a velocity feedback correction unit for outputting a corrected velocity feedback signal based on a self-axis velocity and another axis-velocity;

a velocity control unit for outputting a feedback torque command based on the velocity command outputted from the position control unit, and the corrected velocity feedback signal outputted from the velocity feedback correction unit;

a model torque correction unit for correcting, according to another-axis model acceleration, the self-axis position, and the other-axis position, the model acceleration, to calculate a model torque; and an accumulator for calculating a torque command based on the model torque and the feedback torque command.

15. A servo controller according to claim 14, wherein:

the reference model control unit is further for calculating, based on the position command, a model velocity for simulating the ideal movement for the machine; and the velocity control unit outputs the feedback torque command based on the velocity command outputted from the position control unit, the model velocity, and the corrected velocity feedback signal outputted from the velocity feedback correction unit.

* * * * *